(12) United States Patent
Katayama (10) Patent No.: US 6,980,694 B2
(45) Date of Patent: Dec. 27, 2005

(54) PICTURE DECODING APPARATUS, PICTURE DECODING METHOD AND RECORDING MEDIUM FOR STORING THE PICTURE DECODING METHOD

(75) Inventor: Hiroshi Katayama, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/649,122

(22) Filed: Aug. 27, 2003

(65) Prior Publication Data

US 2005/0074175 A1    Apr. 7, 2005

Related U.S. Application Data

(63) Continuation of application No. 09/569,903, filed on May 11, 2000, now Pat. No. 6,628,838.

(30) Foreign Application Priority Data

May 13, 1999 (JP) ................................ 11-132800

(51) Int. Cl.[7] .............................................. G06K 9/36
(52) U.S. Cl. ...................................................... 382/233
(58) Field of Search ............................... 382/232, 233, 382/236, 238, 239, 240; 375/240.01, 240.25, 375/240.26; 348/419.1, 423.1, 425.1, 714, 348/715, 716

(56) References Cited

U.S. PATENT DOCUMENTS

| | | | |
|---|---|---|---|
| 5,122,875 A * | 6/1992 | Raychaudhuri et al. .. | 348/390.1 |
| 5,267,021 A * | 11/1993 | Ramchandran et al. ..... | 348/469 |
| 5,543,932 A | 8/1996 | Chang et al. .......... | 375/240.01 |
| 5,642,338 A * | 6/1997 | Fukushima et al. ........... | 386/96 |
| 5,805,537 A | 9/1998 | Yamamoto et al. ........... | 369/32 |
| 5,870,087 A | 2/1999 | Chau .......................... | 345/302 |
| 5,990,955 A | 11/1999 | Koz .......................... | 348/390.1 |
| 6,229,851 B1 | 5/2001 | Cotton .................. | 375/240.25 |
| 6,259,740 B1 | 7/2001 | Lyu ........................ | 375/240.25 |
| 6,301,299 B1 | 10/2001 | Sita et al. .............. | 375/240.01 |
| 6,308,006 B1 | 10/2001 | Yamamoto et al. ........... | 386/96 |
| 6,628,838 B1 * | 9/2003 | Katayama ................... | 382/233 |

* cited by examiner

*Primary Examiner*—Jose L. Couso
(74) *Attorney, Agent, or Firm*—Frommer Lawrence & Haug LLP; William S. Frommer; Thomas F. Presson (57) ABSTRACT

In a demultiplexer, picture signals of channels included in an input transport stream are separated from each other and supplied to VBV buffers for the respective channels to be stored therein. Picture signals read out from the VBV buffers are supplied to a signal switch for selecting one of the signals in accordance with a switch changeover signal generated by a switch controller. The selected picture signals selected from the VBV buffers are supplied to a variable-length decoder for decoding the signals on a time-division basis. Decoded picture data of a channel is selected by another signal switch in accordance with another switch changeover signal generated by the switch controller and supplied to one of picture memories for the channel to be stored therein. A display controller reads out a plurality of picture signals from the picture memories synchronously in accordance with a display timing signal generated by a display controller. As a result, a plurality of pieces of encoded data can be decoded by using only one decoding system.

5 Claims, 6 Drawing Sheets

PICTURE DECODING APPARATUS, PICTURE DECODING METHOD AND RECORDING MEDIUM FOR STORING THE PICTURE DECODING METHOD

CROSS-REFERENCE TO RELATED APPLICATION

This application is a continuation application of U.S. patent application Ser. No. 09/569,903, filed May 11, 2000 now U.S. Pat. No. 6,628,838.

BACKGROUND OF THE INVENTION

In general, the present invention relates to a picture decoding apparatus, a picture decoding method adopted in the apparatus and a recording medium for storing the method. More particularly, the present invention relates to a picture decoding apparatus, a picture decoding method adopted in the apparatus and a recording medium for storing the method whereby a plurality of picture signals are input and decoded at the same time to output decoded picture signals synchronously with each other.

Figure 1:
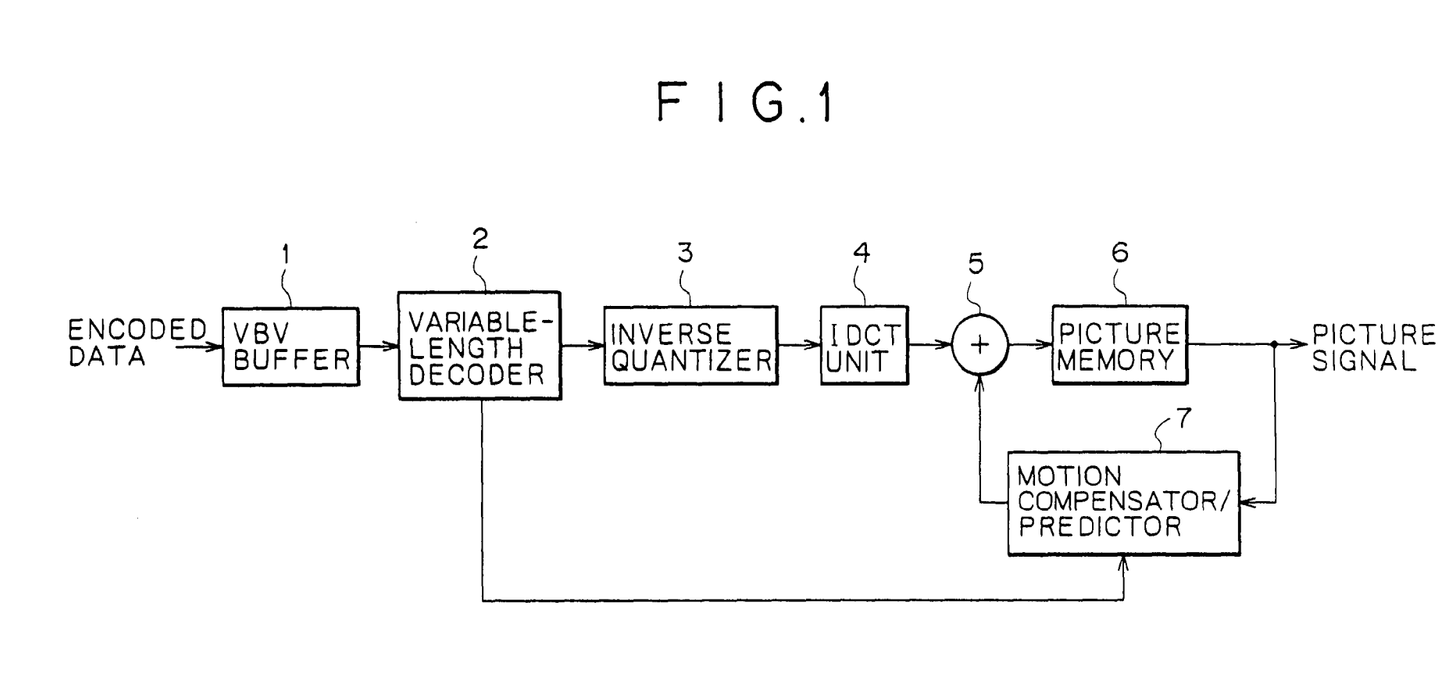
FIG. 1 is a block diagram showing a configuration of a related art picture decoding apparatus.

FIG. 1 is a diagram showing a typical configuration of a related art picture decoding apparatus. Data encoded in accordance with an MPEG (Moving Picture Experts Group) system is supplied to a VBV (Video Buffering Verifier) buffer 1 to be stored therein. The VBV buffer 1 is used for absorbing variations in transfer rate for encoded data received at a variable transfer rate before the data is supplied to a variable-length decoder 2 continuously at a fixed transfer rate. The variable-length decoder 2 decodes the encoded data, outputting a picture signal component to an inverse quantizer 3 and a motion vector to a motion compensator/predictor 7.

In the inverse quantizer 3, the input signal is quantized. In an inverse DCT (IDCT) unit 4, a DCT (Discrete Cosine Transform) coefficient received from the inverse quantizer 3 is subjected to an inverse DCT process. The motion compensator/predictor 7 carries out motion compensation on an already decoded picture signal stored in a picture memory 6 in accordance with a motion vector and generates a predicted signal. The output of the IDCT unit 4 is supplied to an adder 5 to be added to the predicted signal output by the motion compensator/predictor 7. A sum obtained as a result of the addition by the adder 5 is stored in the picture memory 6. A picture signal stored in the picture memory 6 is read out from the memory 6 to be output typically to a display unit not shown in the figure.

By the way, in the case of digital satellite broadcasting, picture signals of a plurality of channels (typically, 3 channels) are included in transmission channels for 1 transponder. When pictures of the 3 channels are displayed on a multiscreen as a moving picture at the same time, the decoding system shown in FIG. 1 is required for each of the 3 channels. As a result, there is raised a problem of a higher cost and a larger size.

SUMMARY OF THE INVENTION

It is thus an object of the present invention addressing the problem described above to provide a capability of decoding a plurality of picture signals without making the configuration of the decoding system complicated, increasing the size of the apparatus and raising the cost.

To achieve the above object, according to a first aspect of the present invention, there is provided a picture decoding apparatus including: an input means for inputting a plurality of picture signals; a first storage means for storing the picture signals input by the input means independently of each other; a first select means for selecting a predetermined one among the picture signals stored in the first storage means; a decoding means for decoding a picture signal selected by the first select means; a second select means for selecting a predetermined one among picture signals decoded by the decoding means; and a second storage means for storing picture signals selected by the second select means.

According to a second aspect of the present invention, there is provided a picture decoding method including: an input step of inputting a plurality of picture signals; a first storage step of storing the picture signals input at the input step independently of each other; a first select step of selecting a predetermined one among the picture signals stored at the first storage step; a decoding step of decoding a picture signal selected at the first select step; a second select step of selecting a predetermined one among picture signals decoded at the decoding step; and a second storage step of storing picture signals selected at the second select step.

According to a third aspect of the present invention, there is provided a recording medium for storing a program, the program including: an input step of inputting a plurality of picture signals; a first storage step of storing the picture signals input at the input step independently of each other; a first select step of selecting a predetermined one among the picture signals stored at the first storage step; a decoding step of decoding a picture signal selected at the first select step; a second select step of selecting a predetermined one among picture signals decoded at the decoding step; and a second storage step of storing picture signals selected at the second select step.

With the picture-signal decoding apparatus, the picture-signal decoding method and the recording medium according to the present invention, a plurality of picture signals are stored independently of each other; a predetermined one is selected among the stored picture signals; the selected picture signal is decoded; and a predetermined one is selected among the decoded picture signals and stored.

DETAILED DESCRIPTION OF THE PREFERRED EMBODIMENT

Figure 2:
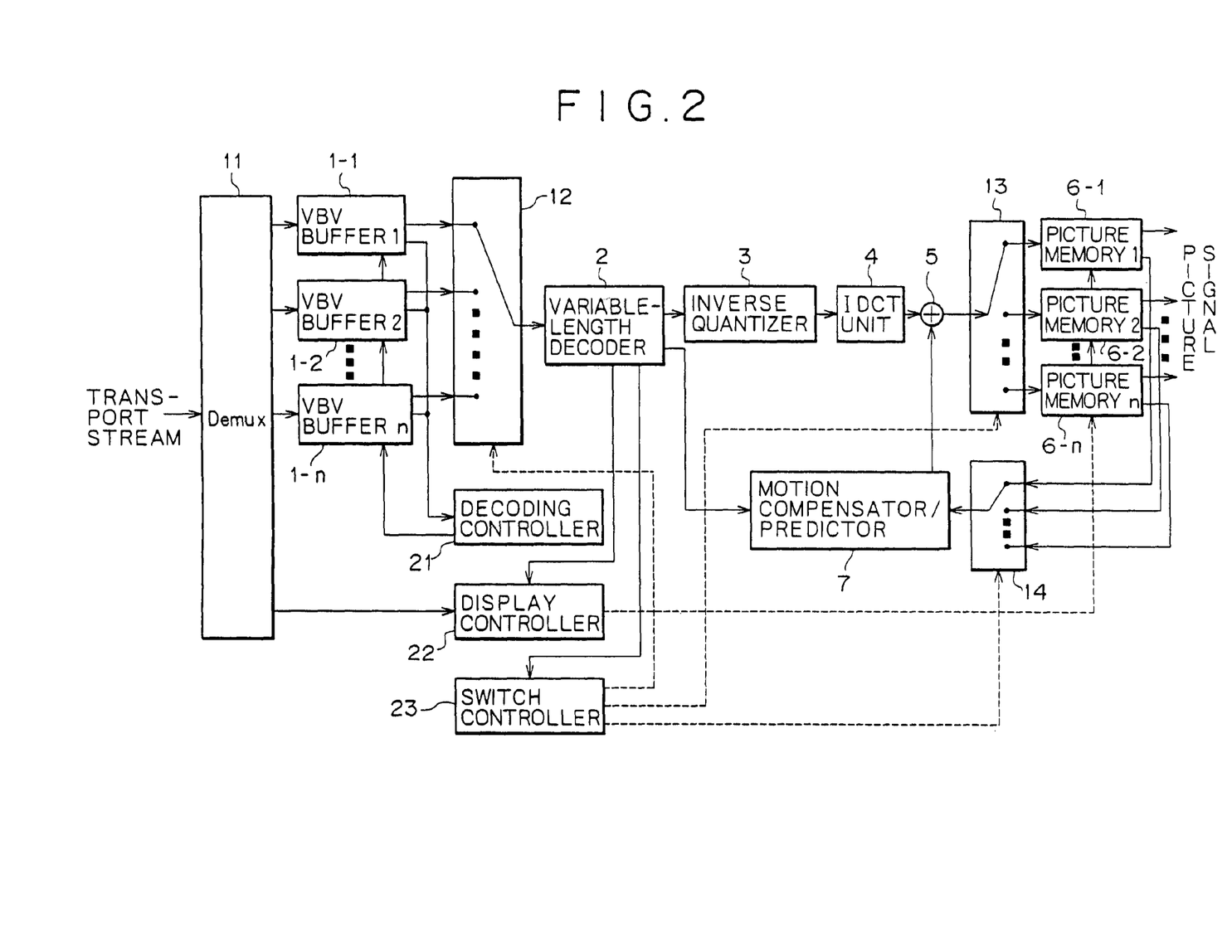
FIG. 2 is a block diagram showing a configuration of a picture decoding apparatus to which the present invention is applied.

FIG. 2 is a block diagram showing a typical configuration of a picture decoding apparatus to which the present invention is applied. A transport stream comprising multiplexed picture signals of a plurality of channels is supplied to a demultiplexer 11 which is referred to hereafter as a demux 11. In the demux 11, the picture signals of the channels are separated from each other and supplied to VBV buffers 1-1 to 1-n for the respective channels to be stored therein. Picture signals read out from the VBV buffers 1-1 to 1-n are supplied to a signal switch 12 for selecting one of the signals in accordance with a switch changeover signal generated by a switch controller 23. The selected picture signal from the VBV buffer 1-i, where i=1, 2, 3, - - - n, is supplied to a variable-length decoder 2. It should be noted that the operation of the signal switch 12 according to the switch changeover signal will be described later. A decoding controller 21 controls operations to write and read out picture signals into and from the VBV buffers 1-1 to 1-n in accordance with a read pointer RP and a write pointer WP output by the VBV buffers 1-1 to 1-n.

Since the functions of the components, from the variable-length decoder 2 to the motion compensator/predictor 7, have been explained earlier by referring to FIG. 1, their explanation is not repeated here. A decoded picture signal is supplied from an adder 5 to a signal switch 13 for passing on the signal to a selected one of picture memories 6-1 to 6-n which are each associated with a channel. One of the picture memories 6-1 to 6-n is selected in accordance with a switch changeover signal generated by the switch controller 23. Each of the picture memories 6-1 to 6-n is used for holding a field picture used in conversion of reference pictures of 2 frames comprising an I picture and a P picture and a picture of a macroblock unit for outputting a B picture in the MPEG system into a picture of a field unit. A picture signal is output from any one of the picture memories 6-1 to 6-n with display timing controlled by a display control signal output by a display controller 22. In addition, picture signals output from the picture memories 6-1 to 6-n are supplied to a signal switch 14 for selecting one of the picture signals for a channel determined by a switch changeover signal generated by the switch controller 23. The picture signal selected by the signal switch 14 is supplied to the motion compensator/predictor 7.

Next, its operation is exemplified by a case in which an input transport stream includes picture signals of 3 channels. The demux 11 separates the transport stream supplied thereto into 3 pieces of encoded data for the 3 channels respectively. The separated data of the first channel is supplied to a VBV buffer 1-1 to be stored therein. By the same token, the separated pieces of data of the second and third channels are supplied to VBV buffers 1-2 and 1-3 respectively to be stored therein. Pieces of encoded data stored in the VBV buffers 1-1 to 1-3 are output to a signal switch 12.

First of all, the signal switch 12 selects the encoded data of the first channel output from the VBV buffer 1-1 in accordance with a switch changeover signal generated by the switch controller 23 and outputs the selected data to the variable-length decoder 2. The encoded data of the first channel is decoded by the variable-length decoder 2 and the motion compensator/predictor 7 before being output to a signal switch 13. Since the decoding process is the same as that explained earlier by referring to FIG. 1, its explanation is not repeated.

The signal switch 13 selects a picture signal of the first channel in accordance with a switch changeover signal generated by the switch controller 23 and outputs the selected picture signal to the picture memory 6-1. Much like the data of the first channel, the encoded data of the second channel is decoded and stored in the picture memory 6-2 as a picture signal. By the same token, the encoded data of the third channel is decoded and stored in the picture memory 6-3 as a picture signal.

The display controller 22 reads out picture signals of the first to third channels from the picture memories 6-1 to 6-3 respectively at the same time with predetermined display timing. The picture signals are synthesized by a circuit at a later stage not shown in the figure to generate a picture of 1 screen to be displayed as a multiscreen on a display unit.

It should be noted that, in compensation of a picture signal for the first channel, an already decoded picture signal stored in the picture memory 6-1 is selected by the signal switch 14 in accordance with a switch changeover signal generated by the switch controller 23 and supplied to the motion compensator/predictor 7. Picture signals of the second and third channels are compensated in the same way as a picture signal of the first channel.

As described above, in the picture decoding apparatus provided by the present invention, a plurality of pieces of encoded data are supplied by the signal switch 12 on a time-division basis to a decoding system which comprises the variable-length decoder 2 and the motion compensator/predictor 7. A plurality of decoded picture signals are then selected by the signal switch 13 and stored in the picture memories 6-1 to 6-n. Subsequently, a plurality of picture signals are read out from the picture memories 6-1 to 6-n to produce a picture signal with synchronization among the picture signals secured by a display control signal generated by the display controller 22.

Next, the functions of the decoding controller 21, the display controller 22 and the switch controller 23 are explained in detail. The decoding controller 21 monitors the states of a plurality of VBV buffers 1-1 to 1-n and controls operations to write and read out data into and from the VBV buffers 1-1 to 1-n. The display controller 22 controls display timings of a plurality of picture signals. The switch controller 23 controls the signal switch 12 for switching encoded data to be supplied to the variable-length decoder 2, controls the signal switch 13 for switching a decoded picture signal to be output and controls the signal switch 14 for switching a decoded picture signal to be fed back to the motion compensator/predictor 7.

Figure 3:
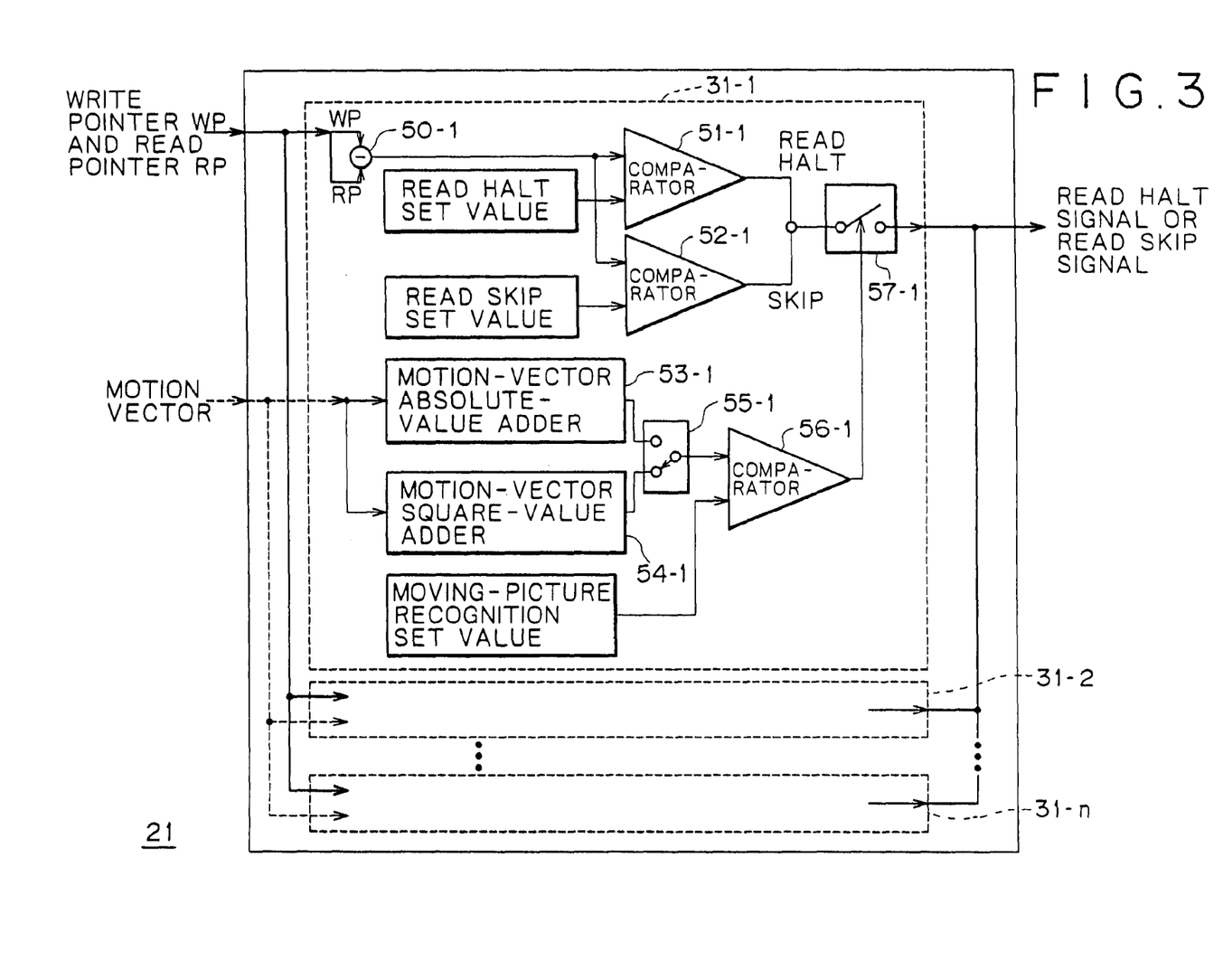
FIG. 3 is a block diagram showing a configuration of a decoding controller employed in the picture decoding apparatus shown in FIG. 2.

First of all, the configuration of the decoding controller 21 is explained by referring to FIG. 3. As shown in the figure, the decoding controller 21 comprises VBV-buffer monitoring units 31-1 to 31-n for monitoring the states of the VBV buffers 1-1 to 1-n and controlling operations to write and read out data into and from the VBV buffers 1-1 to 1-n respectively. The VBV-buffer monitoring unit 31-1 comprises a subtractor 50-1 and comparators 51-1 and 52-1. The subtractor 50-1 subtracts a read pointer RP from a write pointer WP. The read pointer RP and the write pointer WP are generated by the VBV buffer 1-1. The comparator 51-1 compares a difference obtained as a result of subtraction produced by the subtractor 50-1 with a read halt set value. On the other hand, the comparator 51-2 compares the difference with a read skip set value. The VBV-buffer monitoring unit 31-1 also has a motion-vector absolute-value adder 53-1 and a motion-vector square-value adder 54-1. The motion-vector absolute-value adder 53-1 adds the absolute values of motion vectors in 1 video frame input from the variable-length decoder 2. On the other hand, the motion-vector square-value adder 54-1 adds the square values of motion vectors in 1 video frame input from the variable-length decoder 2. Sums produced by the motion-vector absolute-value adder 53-1 and the motion-vector square-value adder 54-1 are supplied to a switch 55-1.

The switch 55-1 selects one of the sums received from the motion-vector absolute-value adder 53-1 and the motion-vector square-value adder 54-1 in accordance with a signal generated by a controller not shown in the figure, outputting the selected sum to a comparator 56-1. The comparator 56-1 compares data representing a motion quantity received from the switch 55-1 with a moving-picture recognition set value and outputs a result of comparison to a switch 57-1. The result of comparison generated by the comparator 56-1 is used as a signal for controlling the switch 57-1. In accordance with this control signal, the switch 57-1 selects a read halt signal output by the comparator 51-1 or a read skip signal output by the comparator 52-1 and outputs the selected signal to the VBV buffers 1-1 to 1-n. It should be noted that the VBV-buffer monitoring units 31-2 to 31-n each have the same configuration as the VBV-buffer monitoring unit 31-1 even though the configurations of the VBV-buffer monitoring units 31-2 to 31-n are not shown in the figure.

The state of the VBV buffer 1-i is monitored by comparing the write pointer WP with the read pointer RP. The write pointer WP points to a position in the VBV buffer 1-i to which input encoded data is to be written. On the other hand, the read pointer RP points to a position in the VBV buffer 1-i from which data is to be read out.

Figure 4:
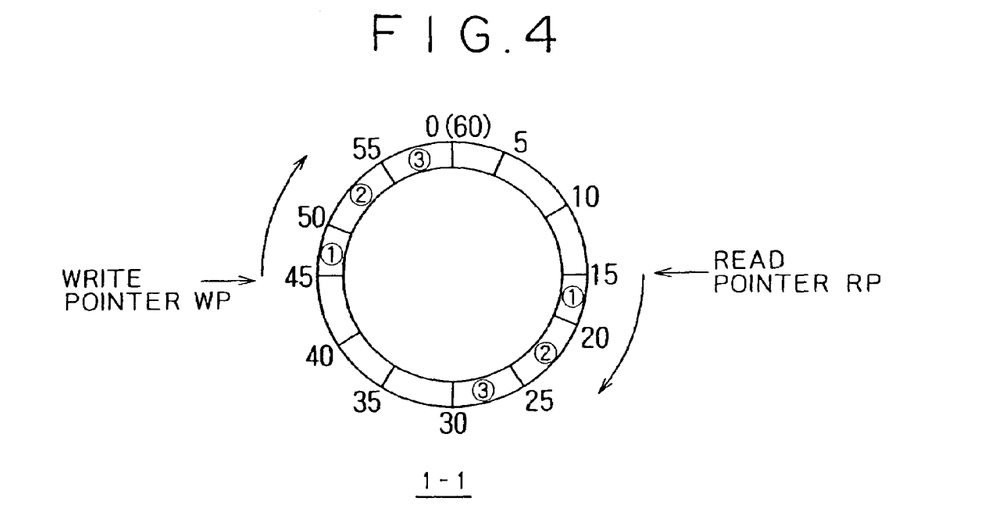
FIG. 4 is an explanatory diagram used for describing the operation of a VBV buffer employed in the picture decoding apparatus shown in FIG. 2.

The state of the VBV buffer 1-1 is explained by referring to FIG. 4. As shown in the figure, the VBV buffer 1-1 is designed as a ring memory. In the state shown in the figure, the write pointer WP points to a position at an address of 45 while the read pointer RP points to a position at an address of 15. Assume that the amount of encoded data written in 1 write operation into the VBV buffer 1-1 corresponds to the amount of data stored in 5 addresses. In this state, let a first piece of encoded data be written into the VBV buffer 1-1. In this case, the encoded data is stored at 5 addresses starting with the address of 45. Thus, at the end of this write operation, the write pointer WP is updated to an address of 50 which follows the last address of 49 of the first piece of encoded data. This write operation is repeated thereafter.

In order to make the explanation simple, assume that data is also read out from 5 addresses in a one read operation. Thus, at the end of this first read operation, the read pointer RP is updated to an address of 20. This read operation is also repeated thereafter.

Read and write operations are carried out independently of each other. Thus, the read pointer RP and the write pointer WP appear to follow each other. In this way, the state of the VBV buffer 1-1 can be monitored by comparing the write pointer WP with the read pointer RP.

In the subtractor 50-1 employed in the VBV-buffer monitoring unit 31-1 shown in FIG. 3, a difference (WP−RP) between the write pointer WP and the read pointer RP is computed and supplied to the comparators 51-1 and 52-1. The comparator 51-1 compares the difference (WP−RP) with the read halt set value. If the difference (WP−RP) is found equal to or smaller than the read halt set value, that is, if the position pointed to by the read pointer RP approaches the position pointed to by the write pointer WP at a distance equal to or shorter than a threshold value, the comparator 51-1 outputs a read halt signal to the VBV buffer 1-1. On the other hand, the comparator 51-2 compares the difference (WP−RP) with the read skip set value. If the difference (WP−RP) is found equal to or greater than the read skip set value, that is, if the position pointed to by the write pointer WP approaches the position pointed to by the read pointer RP at a distance equal to or shorter than a threshold value, the comparator 52-1 outputs a read skip signal to the VBV buffer 1-1.

The motion-vector absolute-value adder 53-1 receives motion-vector values output by the variable-length decoder 2, computing a total sum or a partial sum of the absolute values of motion vectors in 1 frame of the input video signal On the other hand, the motion-vector square-value adder 54-1 receives motion-vector values output by the variable-length decoder 2, computing a total sum or a partial sum of the square values of motion vectors in 1 frame of the input video signal. The switch 55-1 selects a sum output by the motion-vector absolute-value adder 53-1 or a sum output by the motion-vector square-value adder 54-1 and supplies the selected sum to the comparator 56-1. The comparator 56-1 compares the result of the motion-vector computation received from the switch 55-1 with the moving-picture recognition set value set in advance and outputs a result of comparison to the switch 57-1. The result of comparison generated by the comparator 56-1 is used as a signal for controlling the switch 57-1. To be more specific, if the result of the motion vector-computation is smaller than the moving-picture recognition set value, a signal for closing the switch 57-1 is output to the switch 57-1.

That is to say, a result of processing of motion vectors in each frame of an input video signal is used to form a judgment as to whether the frame is a moving picture or a static picture. If the frame is found to be a static picture, the switch 57-1 is closed. At that time, a read halt signal output by the comparator 51-1 or a read skip signal output by the comparator 52-2 is supplied to the VBV buffers 1-1 to 1-n provided at the following stage, allowing the input video signal to be skipped or repeated. In this way, by selectively carrying out skip or repeat processing only for a picture determined to be a static picture, unnaturalness of a joint of pictures can be reduced.

Next, an example of the VBV buffers 1-1 to 1-n is further explained by referring to FIG. 4. In actuality, the VBV buffers 1-1 to 1-n carry out the same processing. For this reason, only the operation of the VBV buffer 1-1 is described. A read halt signal indicates that the operation to read out encoded data from the VBV buffer 1-1 has been carried out too far in comparison with the operation to write data thereto. For example, the value of the write pointer WP is 45 while the value of the read pointer RP is 35 to give a difference (WP−RP) of 10 (= 45−35) which is equal to a read halt set value of 10 set in advance. In this case, the read operation is halted and pictures of the same frames are read out from the picture memories 6-1 to 6-n to display a static picture.

On the other hand, a read skip signal indicates that the operation to read out encoded data from the VBV buffer 1-1 has been carried out too slowly in comparison with the operation to write data thereto. For example, the value of the write pointer WP is 15 while the value of the read pointer RP is 25 to give a difference (WP−RP) of −10 (=15−25) which is equal to a read skip set value of −10 set in advance. In this case, the write operation takes precedence of the read operation, causing an operation to play back a picture of 1 frame to be skipped.

In the above description, the read halt set value and the read skip set value are set at +10 and −10 respectively which are determined from, among other information, the length of encoded data. Thus, the VBV-buffer monitoring unit 31-1 is capable of forming a judgment as to whether the state of the VBV buffer 1-1 is normal or abnormal by monitoring the operations to read out and write data from and into the VBV buffer 1-1.

Figure 5:
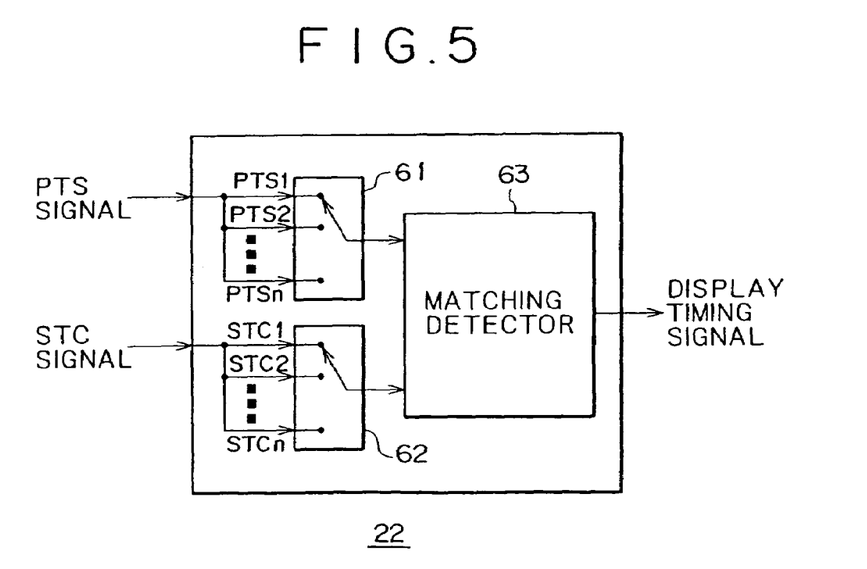
FIG. 5 is a block diagram showing a configuration of a display controller employed in the picture decoding apparatus shown in FIG. 2.

Next, the display controller 22 is explained by referring to FIG. 5. As shown in the figure, the display controller 22 comprises a PTS selector 61, a STC selector 62 and a matching detector 63. The PTS selector 61 inputs a PTS (Presentation Time Stamp) signal included in each of a plurality of pieces of encoded data and selects one of the PTS signals. On the other hand, the STC selector 62 inputs a STC (System Time Clock) signal included in each of a plurality of pieces of encoded data and selects one of the STC signals. The matching detector 63 detects matching of a PTS signal output by the PTS selector 61 and an STC signal output by the STC selector 62.

The PTS selector 61 selects a PTS signal among those of a plurality of pieces of encoded data and the STC selector 62 selects an STC signal among those of a plurality of pieces of encoded data output by the demux 11 in accordance with a command issued by the user. Normally, the STC selector 62 selects an STC signal of a channel selected by the PTS selector 61. When a PTS signal output by the PTS selector 61 matches an STC signal output by the STC selector 62, the matching detector 63 outputs a display timing signal to the picture memories 6-1 to 6-n. The STC signal represents a reference time of a plurality of pieces of encoded data and the PTS signal represents a display time of an encoded picture signal. As a result, a plurality of picture signals are output from the picture memories 6-1 to 6-n synchronously with the reference time of display timing determined by the display controller 22.

Figure 6:
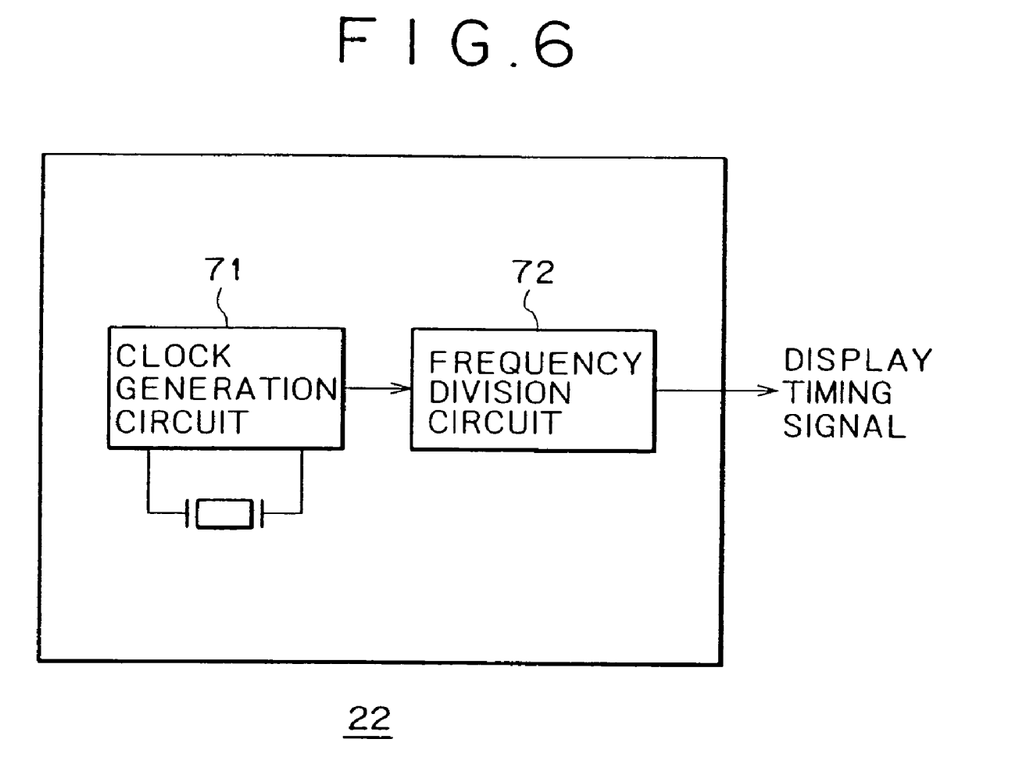
FIG. 6 is a block diagram showing another configuration of the display controller employed in the picture decoding apparatus shown in FIG. 2.

In addition, the display controller 22 can also be configured to include a clock generation circuit 71 and a frequency division circuit 72 as shown in FIG. 6. The frequency division circuit 72 divides the frequency of a reference clock signal generated by the clock generation circuit 71. In this typical configuration, a reference time of display timing for a plurality of picture signals is generated by the frequency division circuit 72 through division of the frequency of a reference clock signal generated by the clock generation circuit 71 by any arbitrary value.

The switch controller 23 outputs switch changeover signals to the signal switches 12, 13 and 14 in accordance with a variable-length decoding status signal generated by the variable-length decoder 2 typically each time decoding of a macroblock unit of encoded data is completed so that the signal switches 12, 13 and 14 are actuated in an interlocked manner.

Figure 7A:
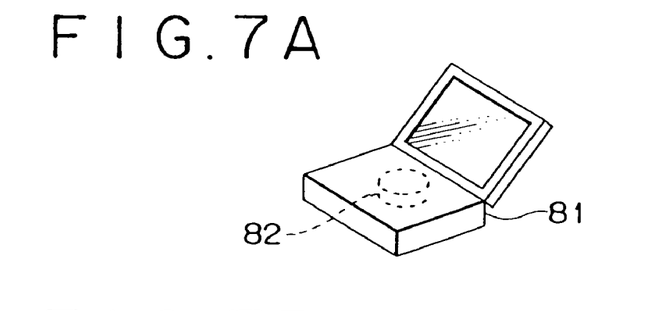
FIGS. 7A to 7C are explanatory diagrams showing recording media.
Figure 7B:
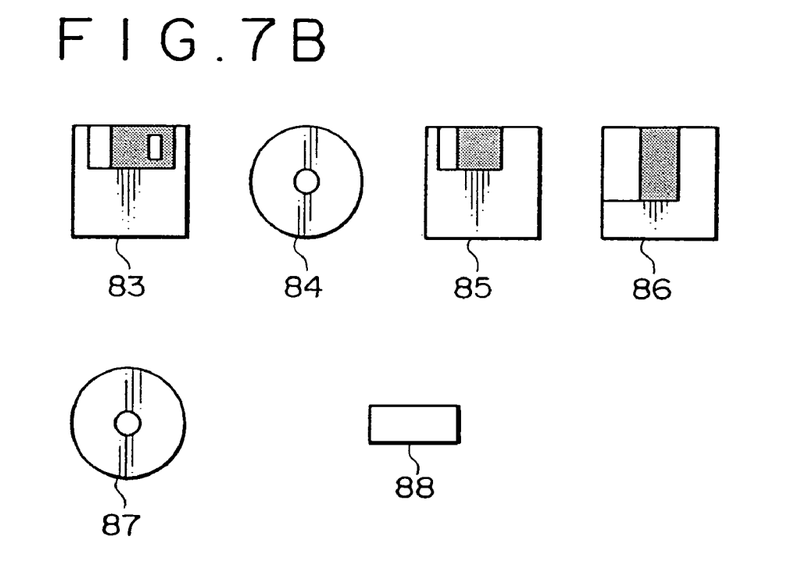
Figure 7C:
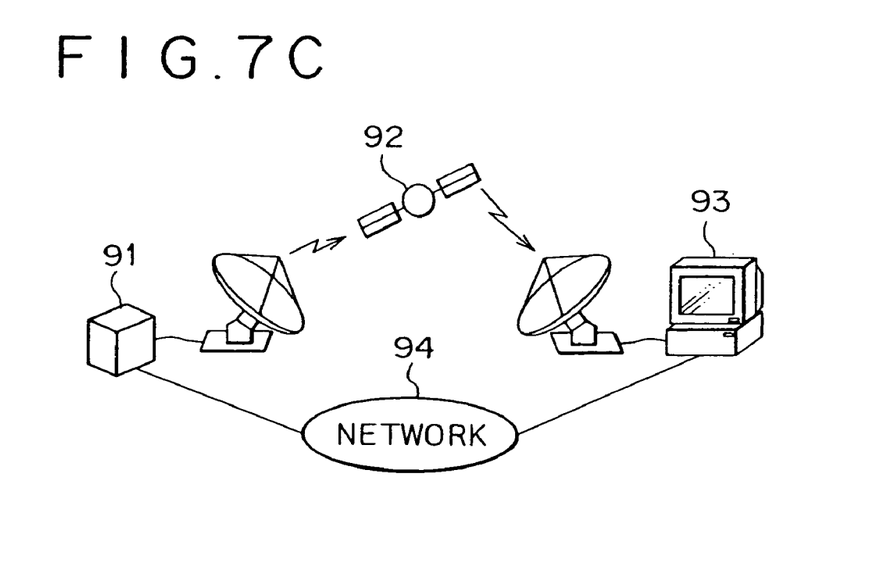

The following description explains a recording media used for installing a program to be executed to carry out a series of pieces of processing described above and used for setting the program in a state of being executable by a computer by referring to FIGS. 7A to 7C.

A program can be presented to the user by installing the program in a hard disc 82 in advance. As shown in FIG. 7A, the hard disc 82 is presented to the user as an embedded recording medium installed in a personal computer 81 in advance.

As an alternative, a program can be presented to the user as a package software by temporarily or permanently storing the program in a recording medium such as a floppy disc 83, a CD-ROM 84, an MO disc 85, a DVD 86, a magnetic disc 87 or a semiconductor memory 88 as shown in FIG. 7B.

As another alternative, a program can be transferred to a personal computer 93 from a download site 91 by radio communication by way of a satellite 92 or transferred to the personal computer 93 by wire or radio communication through a network 94 such as a local area network or the Internet and, in the personal computer 93, the program is downloaded into typically an embedded hard disc as shown in FIG. 7C.

A medium used in this specification is a broadly defined concept including all kinds of media.

As described above, with the picture-signal decoding apparatus, the picture-signal decoding method and the recording medium according to the present invention, a plurality of picture signals are selected, stored and decoded. As a result, the picture signals can be decoded without making the configuration of the decoding system complicated, increasing the size of the apparatus and raising the cost.

While the preferred embodiment of the present invention has been described using specific terms, such description is for illustrative purposes only, and it is to be understood that changes and variations may be made without departing from the spirit or scope of the following claims.

What is claimed is:

1. A picture decoding apparatus comprising:
   decoding means for decoding a plurality of coded signals and outputting respective decoded signals;
   storage means for storing said decoded signals; and
   selecting means for selecting a decoded signal corresponding to a coded signal which is in the decoding process of said decoding means based on a motion-vector computation;
   wherein said decoding means decodes each of said coded signals according to the respective decoded signal selected by said selecting means.

2. A picture decoding apparatus according to claim 1, wherein said decoding means decodes said coded signals according to time division multiplexing.

3. A picture decoding apparatus according to claim 2, wherein said decoding means decodes said coded signals by motion compensating and predicting according to said decoded signal.

4. A picture decoding apparatus according to claim 3, wherein said decoding means inputs video signals which are coded in MPEG and decodes said video signals according to a corresponding decoding procedure.

5. A picture decoding method comprising the steps of:
   decoding a plurality of coded signals and outputting respective decoded signals;
   storing said decoded signals; and
   selecting a decoded signal corresponding to a coded signal which is in the decoding process based on a motion-vector computation;
   wherein each of said coded signals is decoded according to the respective decoded signal selected in said selecting step.

* * * * *